United States Patent [19]

Sulich et al.

[11] 3,858,145

[45] Dec. 31, 1974

[54] MAGNETIC CIRCUIT DEVICE FOR A CONTACTLESS SWITCH OR THE LIKE

[75] Inventors: Michael Sulich, Endicott; Albert W. Vinal, Owego, both of N.Y.

[73] Assignee: International Business Machines Corporation, Armonk, N.Y.

[22] Filed: May 4, 1973

[21] Appl. No.: 357,284

Related U.S. Application Data

[62] Division of Ser. No. 263,832, June 19, 1972, abandoned.

[52] U.S. Cl.............. 338/32 H, 323/94 H, 335/205, 335/215, 338/32 R

[51] Int. Cl............................................... H01c 7/16

[58] Field of Search............. 338/32 H, 32 R; 335/2, 335/205, 215; 324/45, 46; 323/94 H; 340/365 L

[56] References Cited

UNITED STATES PATENTS

| | | | |
|---|---|---|---|
| 3,622,922 | 11/1971 | Moci | 335/2 |
| 3,657,686 | 4/1972 | Masuda et al. | 338/32 H |
| 3,673,537 | 6/1972 | Greger | 338/32 R |

OTHER PUBLICATIONS

McDowell et al., IBM Technical Disclosure Bulletin, "Magnets Resistive Contact-Less Switch" Vol. 12, No. 3, Aug. 1969, pp. 436–437.

D. Phil Hermann Fahlenbrach et al., German App. No. 1127509 Pub. 4/62.

*Primary Examiner*—C. L. Albritton
*Attorney, Agent, or Firm*—John S. Gasper

[57] ABSTRACT

A magnetic circuit comprises a cylindrical disk permanent magnet having oppositely polarized end surfaces and a keeper of soft magnetic material. The permanent magnet has an axial aperture which is cylindrical. The keeper comprises a disk portion which bears on one end surface of the permanent magnet and a cylindrical pin which occupies the aperture of the magnet. The pin terminates in a flat surface which is substantially co-planar with the second opposite surface of the disk magnet. The magnetic circuit provides a high intensity localized magnetic field having field reversal properties for switching magnetic sensor devices such as a Hall effect cell.

2 Claims, 7 Drawing Figures

MAGNETIC CIRCUIT DEVICE FOR A CONTACTLESS SWITCH OR THE LIKE

This is a division, of application Ser. No. 263,832 filed June 19, 1972 now abandoned.

BACKGROUND OF THE INVENTION

1. Field of the Invention

This invention relates to magnetic circuits and particularly to a magnetic circuit useful as an activator element for a Hall sensor or the like. While not necessarily limited thereto, this invention is contemplated for use with a contactless key mechanism which uses a solid state switch employing Hall effect phenomena.

2. Description of Prior Art

Keyboards having contactless switches are well-known in the art. Such devices basically comprise a magnetic field sensing element and a magnetic activator designed to be moved relative to each other to induce a signal in the sensor element. One such contactless switch configuration utilizing the Hall effect, is shown in U.S. Pat. No. 3,596,114. As illustrated there, the magnetic activator comprises two spaced bar magnets with a U-shaped magnetic bridge element. The sensor element is mounted vertically between the bar magnets. Displacement of the magnetic activator with the bar magnets on the opposite sides of the Hall effect sensor produces a magnetic field intensity change, which in turn causes a Hall effect signal to be generated in the sensor element and its associated circuits.

Such a structural arrangement requires a relatively large amount of space. Thus, in a keyboard application where a multiplicity of keys are to be used, such structure could produce a space design problem. Also, registration and alignment of the sensor element vis a vis the magnets may be critical. In the above-mentioned patent the keys must be individually tuned to set the null position of the Hall device. Also, the vertical mounting of the sensor element is not compatible with planar integrated circuit packaging technology.

It is preferable that the magnetic activator be located on one side of the sensor element which can then be an integral part of a planar semiconductor chip. Magnetic activators of the prior art however, do not lend themselves to such an arrangement largely due to the fact that permanent magnet circuits have been inadequate to provide switching field intensities high enough to generate the necessary signals for switching the sensor element such as the Hall effect sensor. In addition, in keyboard applications, certain constraints are imposed on magnet size and available mechanical displacement of a key-operated activator. Thus, a permanent magnet activator satisfactory for solid state switching where the activator is located above or to one side of the sense element must be capable of a very high rate of change in field intensity over a relatively small range of displacement.

SUMMARY OF THE INVENTION

It is therefore an object of this invention to provide an improved magnetic circuit which is able to overcome the disadvantages of the prior art and achieve the objectives stated above.

It is also an object of this invention to provide a magnetic activator for a contactless switch mechanism for a keyboard input device.

It is a specific object of this invention to provide an improved magnetic activator for Hall effect switch sensing.

It is a further specific object of this invention to provide an improved magnetic activator capable of switching sensor elements such as Hall effect cells which are compatible with planar integrated circuit technology.

The above, as well as other objects of this invention, are realized using a magnetic circuit in combination with a magnetic field sensitive sensor device in which the magnetic circuit comprises a permanent magnet having a high intensity localized magnetic field directed from a surface of the magnet. The sensor device is subjected to field intensity variations of this localized field. In the preferred form of this invention the switching magnet structure comprises a cylindrical or disk type permanent magnet having an axial aperture and having end surfaces which are oppositely polarized. It has been discovered that such a permanent magnet produces a magnetic field in space, in the vicinity of the aperture, which reverses direction at some distance from the surface of the aperture cylinder. The location of the field reversal is dependent on the properties of the permanent magnetic material and the disk geometry. This phenomenon is used in implementing this invention by effectuating a relative displacement of the permanent magnet and its associated sensor device to cause the sensor to be subjected to the field reversal as well as the change in the field intensity. The aperture may be provided with a core of soft magnetic material to increase the field intensity while maintaining the field reversal properties of the apertured magnet. For use in key mechanisms in which the magnitude of the relative displacement is severely constrained this invention further provides for the use of a keeper of soft magnetic material in combination with the disk type permanent magnet. The keeper in its preferred form comprises a disk with a pin extending from one surface of the keeper disk. The keeper is assembled to the disk magnet so that the keeper disk bears against one surface of the magnet and the keeper pin is within the aperture of the magnet. In accordance with this invention the pin terminates in a flat surface which is substantially co-planar with the end surface of the permanent magnet proximate the sensor. Also, the pin is sized such that it is substantially force fitted into the axial aperture. With this specific arrangement it was found that the localized magnetic field intensity decays very rapidly in a short distance in the region proximate the surface of the magnet. At the same time the magnetic field reversal will occur within the relatively short distance from the surface of the magnet. Thus, key mechanisms having this structure can provide rapid switching of a sensor device and its associated circuit with a relatively short displacement of the operating parts. Furthermore, with this structure, the activating magnets can be located on one side of the Hall element thereby permitting solid state sensors such as Hall effect cells to be readily integrated with planar circuit technology. With such technology contactless switches for use in devices such as keyboard mechanism can be manufactured at a relatively low cost since special packaging for the vertically-mounted Hall effect switches will not be required.

The foregoing and other objects, features and advantages of the invention will be apparent from the following more particular description of preferred embodiments of the invention, as illustrated in the accompanying drawing.

DESCRIPTION OF THE PREFERRED EMBODIMENTS

Figure 1:
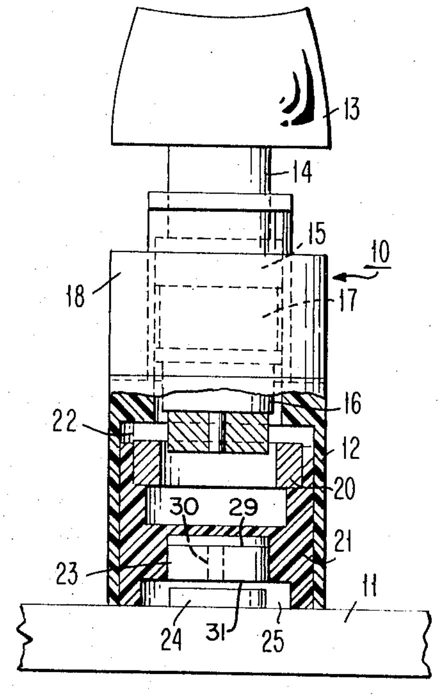
FIG. 1 is an elevational view of a key mechanism with portions in cross-section illustrating the present invention.

Referring to FIG. 1, the invention is shown as part of a key mechanism 10 mounted on a printed circuit board 11. The key mechanism basically comprises an external housing 12 of non-magnetic material fixably attached to the board 11 and an internal operating mechanism operable manually through pressure applied to a key button 13. The key mechanism further includes a reciprocating plunger which consists of shaft 14 having upper and lower bearing portions 15 and 16, respectively, with a permanent magnet 17 sandwiched therebetween for movement therewith. A tubular permanent magnet 18 is mounted external to the upper portion of housing 12 so as to surround permanent magnet 17. Magnets 17 and 18 are polarized in a parallel direction with opposite polarities such that they serve to apply a unidirectional biasing force to the plunger assembly operating in an upward direction. The operating mechanism further comprises an actuator permanent magnet 19 attached to the bottom surface of bearing portion 16. A second actuator magnet 20, which is a ring type permanent magnet, is attached to the upper end of an operating cup member 21, which is reciprocably slidable in chamber 22 in the bottom portion of the housing 12. Permanent magnets 19 and 20 are co-axial magnets magnetized in parallel in the same polar direction. These magnets function upon relative displacement causing cup 21 to reciprocate within chamber 22 with a snap action when the plunger assembly reciprocated. Further details of the operation of the key mechanism may be more fully understood by reference to the co-pending application of A. W. Vinal, Ser. No. 263,831, filed June 19, 1972, now U.S. Pat. No. 3,815,066, issued June 4, 1974.

In a recess in the bottom of the cup 21 is mounted a magnetic switch circuit 23, which in accordance with this invention, is designed to perform a switching operation on a solid state device 24 located within a recess 25 formed in the bottom portion of cup 21. A solid state device 24 which preferably includes a Hall effect cell is part of an integrated circuit which is designed to generate a signal upon the displacement of the magnet switch circuit 23 relative to the surface of the Hall effect cell. While various Hall effect cells would be suitable for use in connection with this invention, a preferred cell would be one which is integratable in silicon technology with an amplifier circuit. A suitable cell would have a sensitivity level of at least 5 mv/kilogauss/volt.

Figure 2:
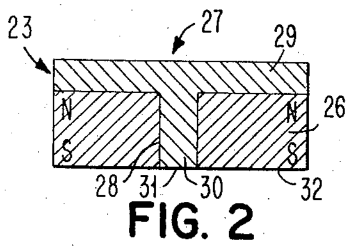
FIG. 2 is a vertical section of a first embodiment of an activator magnetic circuit used in the key mechanism of FIG. 1.

As seen in FIG. 2, a preferred embodiment of a magnetic switch circuit comprises a cylindrical disk permanent magnet 26 and a keeper 27 of soft magnetic material. Permanent magnet 26 has an axial aperture 28 which is cylindrical. Keeper 27 comprises a disk portion 29 and an integral cylindrical pin or core portion 30. Disk portion 29 bears on one end surface of the permanent magnet 26 and is preferably of the same diameter so that the entire surface is covered by the disk portion 29. Core portion 30 has a diameter such that the peripheral surface of the core portion 30 bears against the interior surface of axial aperture 28. It has been found that a very high intensity localized magnetic field can be produced below the magnetic switch circuit 23 along the axis of the core portion 30 of the keeper 27 when the surface 31 of core portion 30 is substantially co-planar with the end surface 32 of permanent magnet 26. It is an essential feature of this invention that surface 31 of core portion 30 and surface 32 of permanent magnet 26 be very precisely coplanar. Small deviations, as much as 25 mils either side of the surface 32 would cause severe degradation in the intensity of the magnetic field at very close distances from the surface 31. Such degradation would effectively destroy the magnetic field intensity qualities of the magnetic switching circuit for use with switching planar type semiconductor Hall effect devices.

Figure 3:
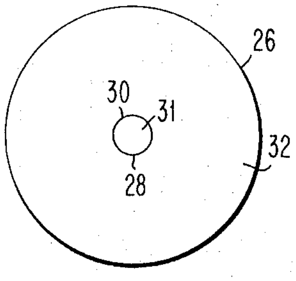
FIG. 3 is a bottom view of the magnetic circuit of FIG. 2.

A specific magnetic switch circuit shown in FIGS. 2 and 3 comprises the following.

Permanent magnet 26 was formed from type 1–H Plastiform magnetic material having a thickness of 90 mils, a diameter of 330 mils with a central aperture having a diameter equal to 50 mils.

Keeper 27 is formed using a magnetic material having a low coercive force and a high saturation magnetization level.

With this type of structure a magnetic field strength of 1,000 Oersteds at a distance of 20 mils from the central axis core 30 was provided. A keeper mechanism having a core portion 30 of greater diameter would tend to reduce the intensity of the magnetic field proximate surface 31. Thus, with this structure it would be preferable to have the keeper 27 with a core portion diameter as small as possible.

Figure 4:
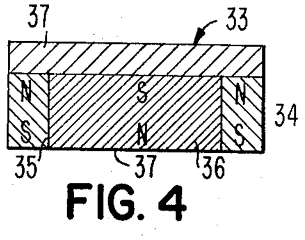
FIG. 4 is a second embodiment of a magnetic circuit for use in practicing this invention.
Figure 5:
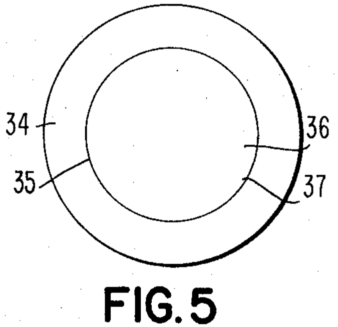
FIG. 5 is a bottom view of the magnetic circuit of FIG. 4.

In a second preferred embodiment of FIGS. 4 and 5 the magnetic switch circuit 33 comprises a cylindrical disk permanent magnet 34 with an axial aperture 35. In this embodiment the axial aperture 35 is occupied by a solid cylindrical disk permanent magnet 36. The end surfaces of permanent magnets 36 and 34 are substantially co-planar. The upper end surfaces of the permanent magnets 36 and 34 have a keeper disk 37 of soft magnetic material. Permanent magnets 34 and 36 are magnetized in parallel but with opposite polarities. With this configuration the localized magnetic field emanating from the bottom surface of the magnetic switch circuit 33 is much greater in area. The magnetic intensity, however, is somewhat reduced compared to the embodiment of FIG. 2, which has a keeper core portion 30 of very greatly reduced diameter. However, the embodiment of FIGS. 4 and 5 would be used in a key mechanism in which the displacement of the magnetic circuit relative to the magnetic sensor is not space limited and where registration of the switching magnetic field relative to the magnetic sensor might be a problem.

The operation of this invention for both embodiments of FIGS. 2, 3 and 4, 5, is based on a permanent magnet with a central aperture parallel to the direction of magnetization. One of the significant features of this invention is based on the fact that the field outside of an apertured disk reverses direction at some predetermined distance above the aperture. The point of field reversal and the rate of change in field amplitude has been determined to be a function of the aspect ratio factor $K5 = T/L$ for the magnet where $T$ is the thickness of the apertured magnet disk and $L$ is the diameter in the case of a cylindrical disk. It has been further determined that the best field reversal properties are found to exist with apertured disks where the aspect ratio factor $K5$ is greater than 2.0. This field reversal position of this invention can best be seen by reference to FIG. 6.

Figure 6:
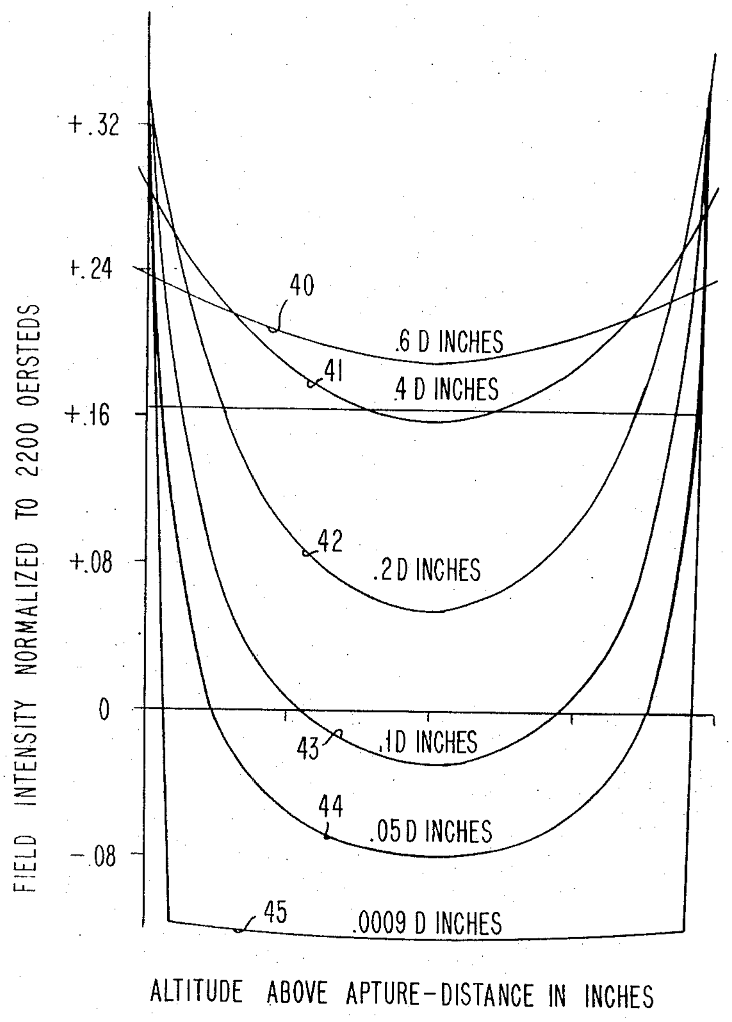
FIG. 6 is a profile chart showing magnetic field characteristics of an apertured magnetic disc at normalized altitudes above the surface of the magnet within the aperture area relative to the diameter of the aperture.

In FIG. 6 the ordinate of the graph represents normalized field intensity while the abscissa represents distance across the aperture of a permanent magnet disc having end surfaces oppositely polarized. The 0 coordinate of the abscissa represents the longitudinal axis of the aperture whereas the ordinate line and the vertical line represent the extremities of the aperture. FIG. 6 represents the field profile for a permanent magnet having the following properties.

Parameter $K5 = 1.8$ and the outside diameter of the ring magnet is twice that of the inside diameter.

The apertured disk consists of a material like Plastiform 1-*H* with a saturation magnetization of at least 2,000 Oersteds and a coercive force in excess of 2,500 Oersteds.

As seen in FIg. 6, curve 40 shows that at a vertical distance of $0.6D$ inches from a surface of an apertured disk magnet with aperture diameter $D$, the field strength across the aperture decreases slightly to a low point at the center of the aperture. As seen in FIG. 6, the field intensity change at the center of the aperture is greatly increased at distances progressively closer to the surface of the magnet (see curves 41 and 42). At some critical distance, for example, $0.1D$ inch, as shown by curve 43, the polarity of the field reverses, and as the distance from the magnet surface is further decreased (see curves 44 and 45) the intensity range and direction increases rapidly.

Thus, in accordance with this invention, the displacement of a magnetic switch element with axial aperture over a relatively short distance relative to a magnetic sensor, produces relatively large field changes as well as a change in direction. Where the keeper structure of FIGS. 2 and 3 is used, the rate of decay as well as the magnitude of change in field intensity is greatly amplified in the vicinity of the flat surface 31 of pin 30.

Figure 7:
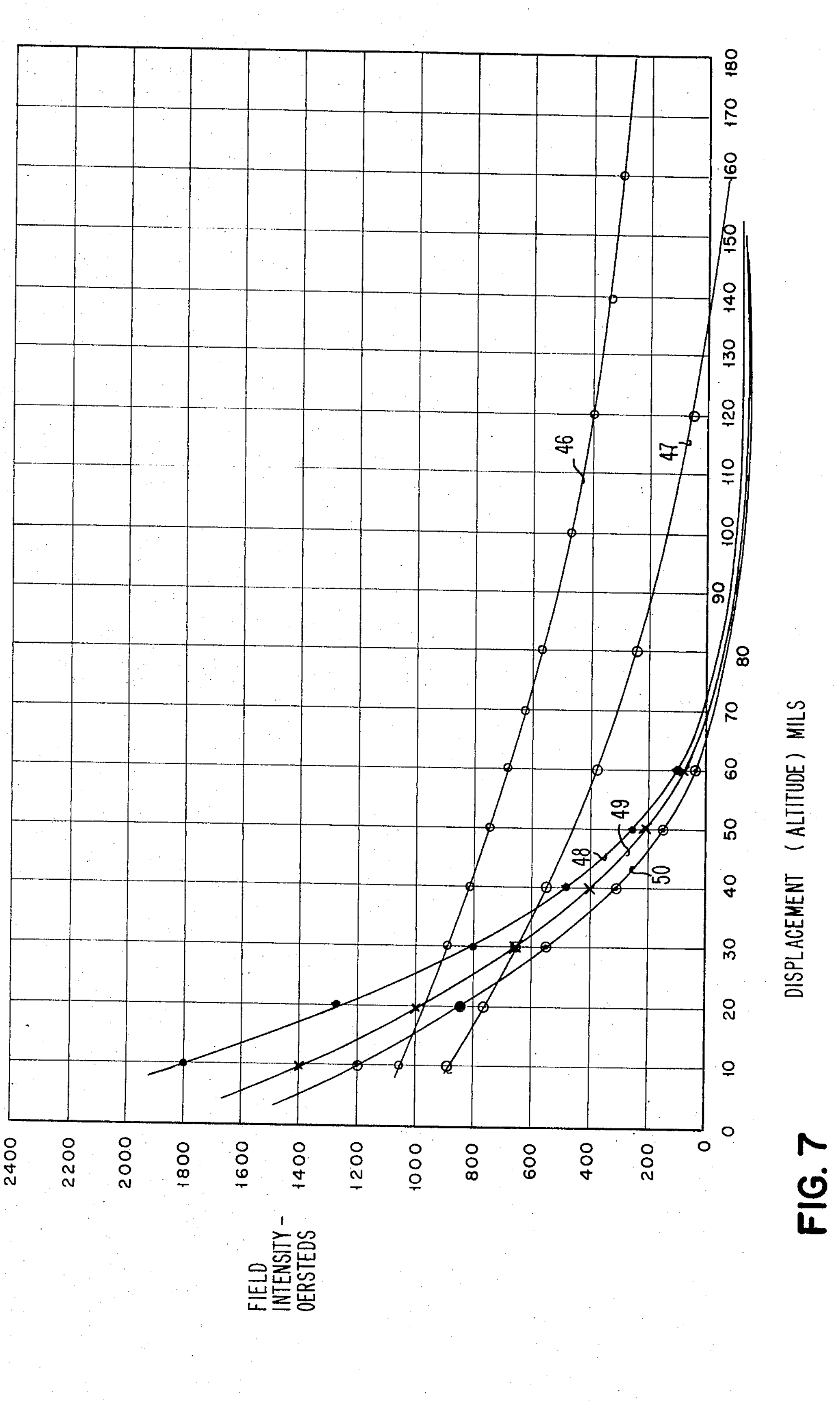
FIG. 7 is a graph showing magnetic field strength relative to distance for various permanent magnet structures including the embodiments illustrated in FIGS. 2 - 5.

This is illustrated further in FIG. 7, which shows the field intensity levels as a function of axial displacement for various magnetic switch circuits. As seen in FIG. 7, curve 46 represents the field intensity-displacement relationship for a cylindrical disk magnet 330 mils in diameter without an aperture. Curve 47 shows the field intensity-displacement for switch circuit 33 of FIGS. 4 and 5. Curves 48–50 show intensity-displacement characteristic curves for various switch circuits 23 of FIGS. 2 and 3.

As seen in FIG. 7, in a non-apertured disk magnet a large field intensity change can occur only where a relatively large displacement takes place. Thus, such magnets would have application in keys of relatively slow speed and large plunger displacements. An apertured disk magnet with a concentric magnet disk produces a field reversal which is relatively easily sensed. An apertured disk magnet with pin core provides a very rapid field intensity change over a small displacement and also provides a field reversal. Thus, key mechanisms for magnetic sensor operation such as Hall effect devices can be made in accordance with this invention which have very small displacement requirements thereby making increasingly high speed operation and low profile design possible. Specific details of magnet circuits for curves 48–50 are illustrated in the following table:

| Curve | Outside Diam. Magnet 26 | Aperture 28 Diam. Magnet 26 | Thickness Keeper Disk 29 | Thickness Magnet 26 | Material Magnet 26 |
|---|---|---|---|---|---|
| 48 | 500 mils | 50 mils | 25 mils | 90 mils | Plastiform 1-H |
| 49 | 330 mils | 50 mils | 25 mils | 90 mils | Plastiform 1-H |
| 50 | 250 mils | 50 mils | 25 mils | 90 mils | Plastiform 1-H |

While the invention has been particularly shown and described with reference to preferred embodiments thereof, it will be understood by those skilled in the art that the foregoing and other changes in form and details may be made therein without departing from the spirit and scope of the invention.

We claim:

1. In an electric pushbutton switch, a key mechanism comprising,
- a first member,
- a second member movable relative to said first member between first and second switch positions,
- a Hall element mounted on said first member and having a sensing surface,
- said Hall element being operable for detecting changes in the direction of magnetic field for producing a switching signal,
- and a switching magnet mounted on said second member for relative movement therewith between said first and second switch positions,
- said switching magnet comprising a cylindrical permanent magnet having parallel faces of opposite polarity,
- said permanent magnet having one of said faces proximate said sensing surface of said Hall element and movable transversely thereto during relative movement of said second member from said first to said second switch positions,
- said permanent magnet having a cylindrical aperture connecting said parallel faces and parallel with the axis of magnetization thereof, said aperture having an axis perpendicular with said sensing surface of said Hall element and parallel with the direction of relative motion of said first and second members between said first and second switch positions, said aperture producing a concentrated magmetic field with a field reversal region extending beyond said face of said magnet in the vicinity of said sensing surface, said field reversal region of said magnetic field being located within the distance of relative movement between said first and second switch positions, whereby said Hall element is subjected to a reversing magnetic field to produce said switching signal during said relative movement between said first and second switch positions.

2. In an electric pushbutton switch, a key mechanism in accordance with claim 1 in which said switching magnet further includes a keeper of soft magnetic material having a disk-like portion bearing against the parallel face of said permanent magnet remote from said Hall element and a cylindrical core portion extending through said cylindrical aperture of said permanent magnet said core portion terminating in a surface substantially co-planar with said face of said permanent magnet proximate said sensing surface of said Hall element.

* * * * *